(12) United States Patent  
Smith

(10) Patent No.: US 7,083,236 B1
(45) Date of Patent: Aug. 1, 2006

(54) VEHICLE SEAT CUSHION ASSEMBLY

(76) Inventor: Gloria Smith, 612 E. 14th St. #16A, New York, NY (US) 10009

( * ) Notice: Subject to any disclaimer, the term of this patent is extended or adjusted under 35 U.S.C. 154(b) by 52 days.

(21) Appl. No.: 10/782,118

(22) Filed: Feb. 19, 2004

(51) Int. Cl.
*A47C 7/02* (2006.01)

(52) U.S. Cl. ............ 297/452.43; 297/452.42; 297/452.45; 297/229

(58) Field of Classification Search ........ 297/180.11, 297/219.11, 229, 452.13, 452.42, 452.43, 297/452.45, 452.46; 5/421, 724
See application file for complete search history.

(56) References Cited

U.S. PATENT DOCUMENTS

| | | | | |
|---|---|---|---|---|
| 1,982,516 A | * | 11/1934 | Holmested | 297/452.45 |
| 2,127,710 A | * | 8/1938 | Baker | 5/186.1 |
| 2,808,596 A | * | 10/1957 | Schreiner | 5/486 |
| 3,051,966 A | * | 9/1962 | Ness | 297/452.43 |
| 3,262,739 A | * | 7/1966 | Crane | 297/452.43 |
| 3,391,413 A | * | 7/1968 | Crane et al. | 297/452.45 |
| 3,722,955 A | * | 3/1973 | Trotman | 297/452.45 |
| 3,804,462 A | * | 4/1974 | Kobayashi | 297/452.43 |
| 4,143,916 A | * | 3/1979 | Trotman et al. | 297/452.45 |
| 4,621,804 A | * | 11/1986 | Mueller | 280/87.041 |
| 4,693,511 A | | 9/1987 | Seltzer et al. | |
| 4,958,886 A | | 9/1990 | Barattini et al. | |
| 5,134,735 A | * | 8/1992 | Rose | 5/730 |
| 5,234,252 A | | 8/1993 | Wallach | |
| 5,403,065 A | * | 4/1995 | Callerio | 297/180.11 |
| 6,068,332 A | * | 5/2000 | Faust et al. | 297/180.13 |

* cited by examiner

*Primary Examiner*—Peter M. Cuomo
*Assistant Examiner*—Joe Edell

(57) ABSTRACT

A vehicle seat cushion assembly for providing additional comfort and support while facilitating air flow around and through the seat cushion assembly includes upper and lower sections pivotally coupled to each other for facilitating storage. The upper and lower sections are each formed by coupling two layers of grid-like material to each other in generally parallel spaced relationship to permit air to flow freely through the invention during use.

1 Claim, 5 Drawing Sheets

VEHICLE SEAT CUSHION ASSEMBLY

BACKGROUND OF THE INVENTION

1. Field of the Invention

The present invention relates to seat covers and more particularly pertains to a new vehicle seat cushion assembly for providing additional comfort and support while facilitating air flow around and through the seat cushion assembly.

2. Description of the Prior Art

The use of seat covers is known in the prior art. U.S. Pat. No. 4,693,511 issued to Seltzer wt al. on Sep. 15, 1987 describes a seat cover having an enveloping back portion attached by a seam to a seat portion that drapes over a vehicle seat and is attached by straps. Another type of seat cover is U.S. Pat. No. 4,958,886 issued to Harattini et al. on Sep. 25, 1990 discloses an enveloping seat cover having a single opening. U.S. Pat. No. 5,234,252 issued to Wallach on Aug. 10, 1993 discloses a bucket seat cover having an enveloping back portion covering a backrest portion of the bucket seat.

While these devices fulfill their respective, particular objectives and requirements, the need remains for a seat cover that provides support and improved ventilation between the user and the seat to which the invention is attached.

SUMMARY OF THE INVENTION

The present invention generally comprises upper and lower sections pivotally coupled to each other for facilitating storage. The upper and lower sections are each formed by coupling two layers of grid-like material to each other in generally parallel spaced relationship to permit air to flow freely through the invention during use.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
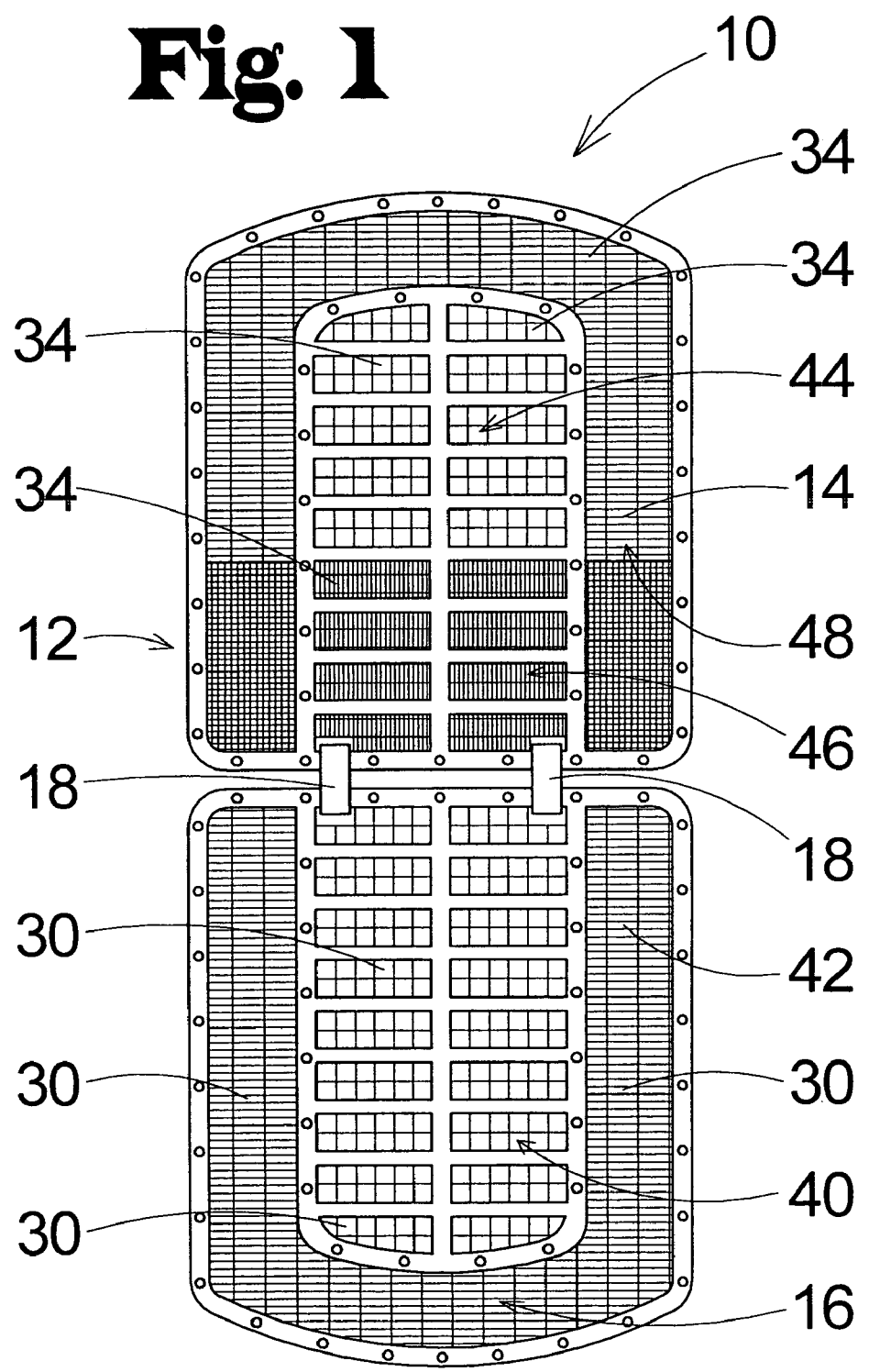
FIG. 1 is a front view of a new vehicle seat cushion assembly according to the present invention.
Figure 2:
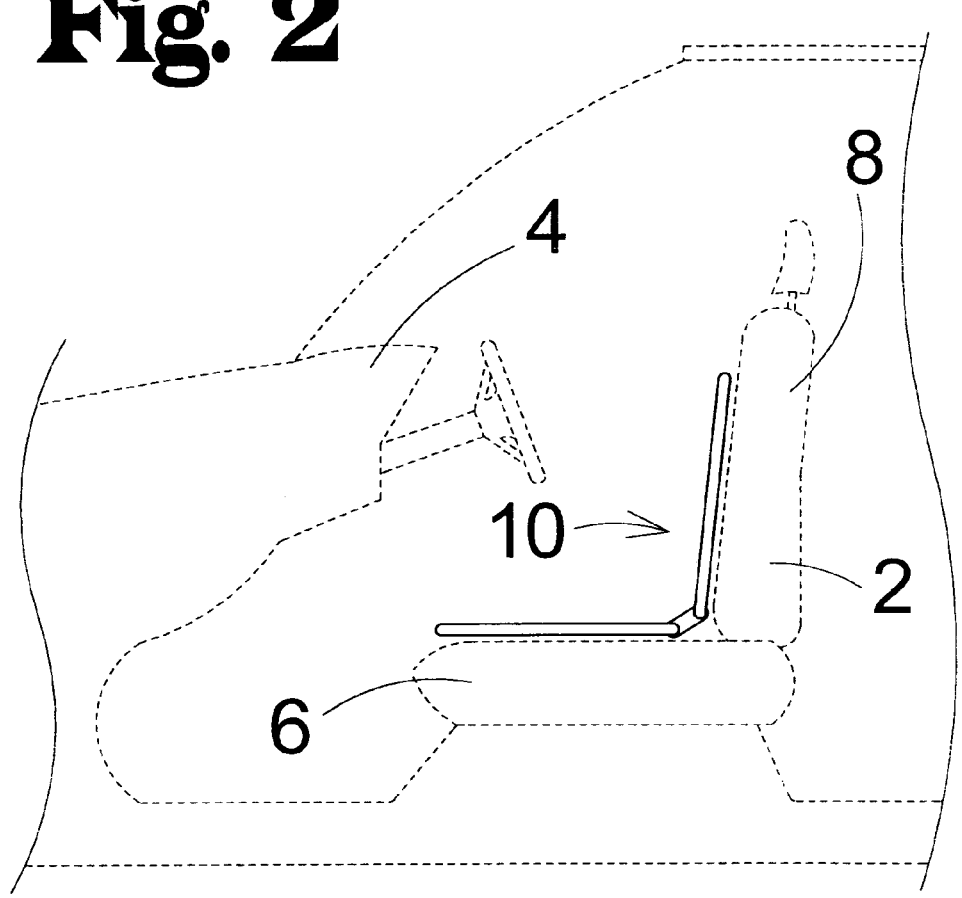
FIG. 2 is a side view of the present invention.
Figure 3:
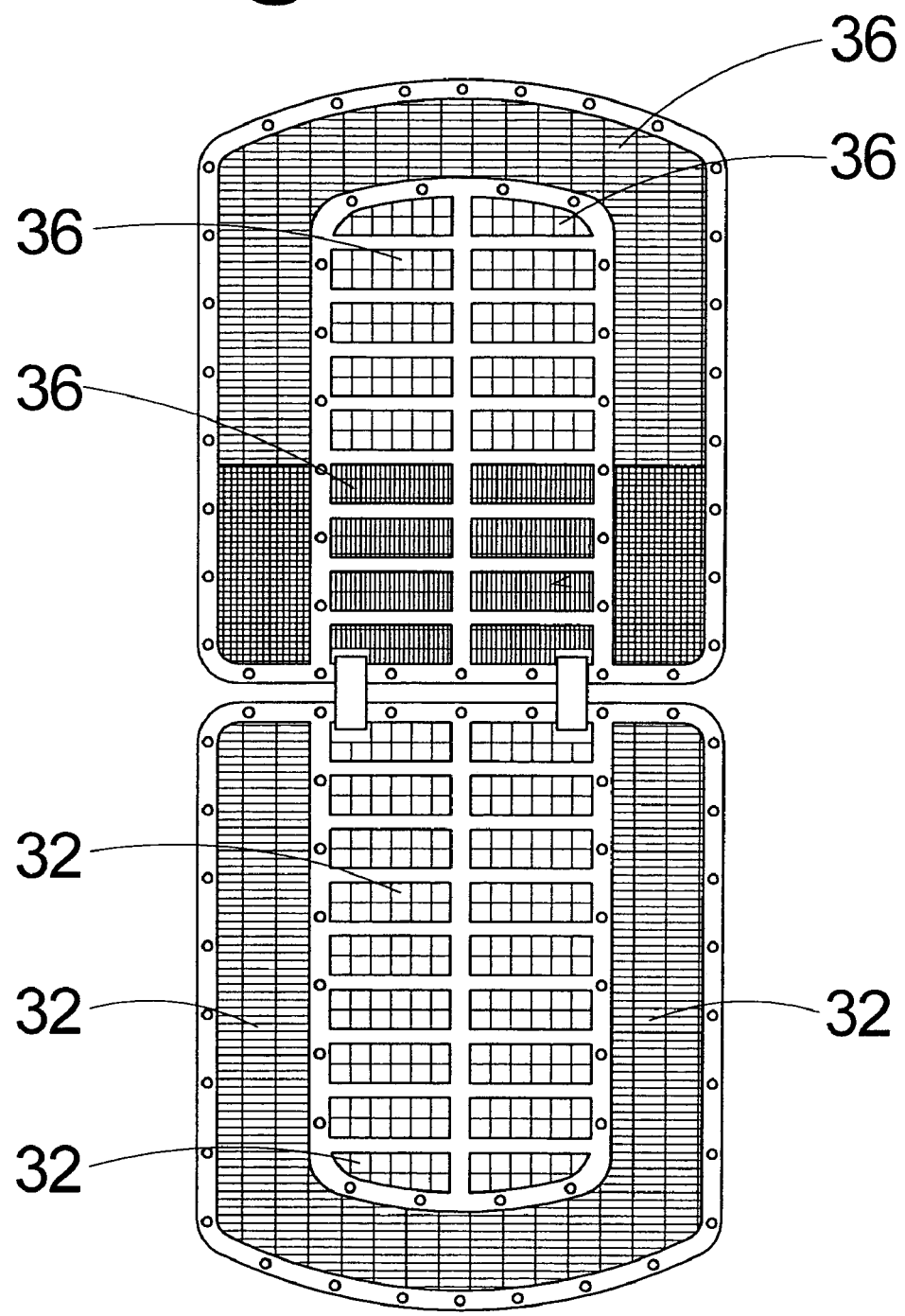
FIG. 3 is a rear view of the present invention.
Figure 4:
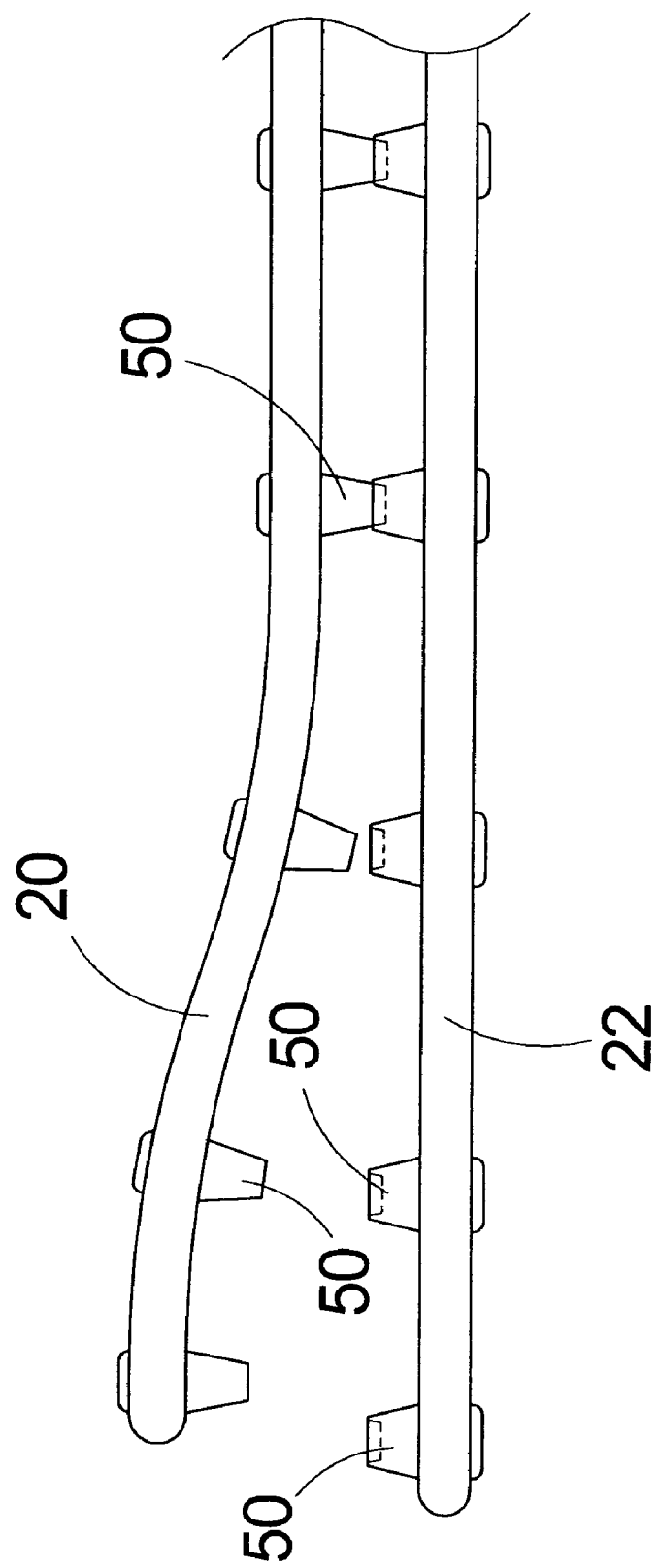
FIG. 4 is an enlarged side view of the lower section of the present invention.
Figure 5:
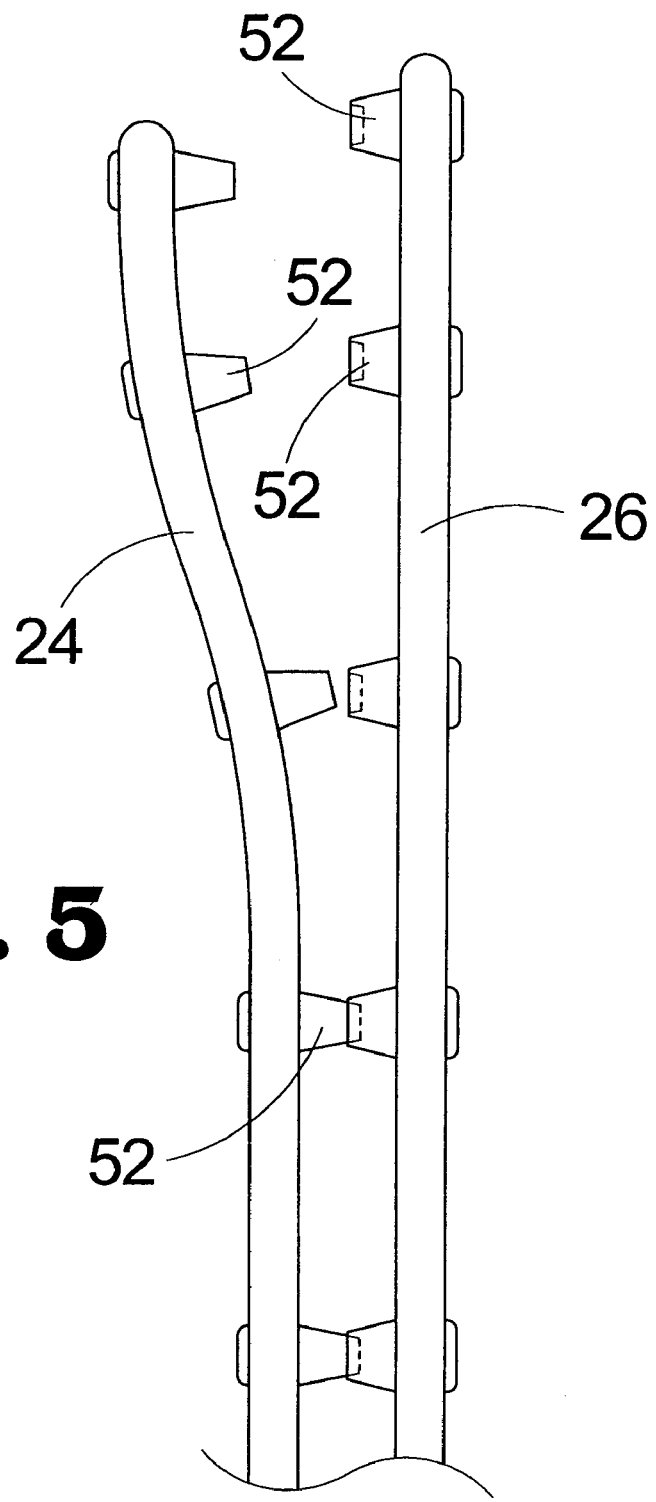
FIG. 5 is an enlarged side view of the upper section of the present invention.

With reference now to the drawings, and in particular to FIGS. 1 through 5 thereof, a new vehicle seat cushion assembly embodying the principles and concepts of the present invention and generally designated by the reference numeral 10 will be described.

As best illustrated in FIGS. 1 through 5, the vehicle seat cushion assembly 10 is designed for use with a seat 2 of a vehicle 4 in which the seat 2 has a base portion 6 and a back portion 8. The vehicle seat cushion assembly 10 generally comprises a main member 12 having an upper section 14 and a lower section 16. The upper and lower sections 14,16 are pivotable with respect to each other using spaced hinge members 18. The upper and lower sections 14,16 are arranged such that the main member 12 is designed for positioning the lower section 14 over the base portion 6 of the vehicle seat 2 and positioning the upper section 16 adjacent to the back portion 8 of the vehicle seat 2. The lower section 14 is formed by a pair of spaced lower section panels 20,22 for permitting ventilation between the spaced lower section panels 20,22. Similarly, the upper section 16 is formed by a pair of spaced upper section panels 24,26 for permitting ventilation between the spaced upper section panels 24,26.

A topmost one of the pair of lower section panels 20 has a plurality of topmost lower section panel openings 30 for facilitating ventilation through the topmost lower section panel 20. Preferably, a lowermost one of the pair of lower section panels 22 has a plurality of lowermost lower section panel openings 32 for facilitating ventilation through the lowermost lower section panel 22.

Similarly for the upper section 16, a topmost one of the pair of upper section panels 24 has a plurality of topmost upper section panel openings 34 for facilitating ventilation through the topmost upper section panel 24. The lowermost one of the pair of upper section panels 26 has a plurality of lowermost upper section panel openings 36 for facilitating ventilation through the lowermost one upper section panel 26.

In an embodiment, the plurality of topmost lower section panel openings 30 are arranged to form zones of similarly configured openings defining a lower section medial portion 40 and a lower section perimeter portion 42. The lowermost lower section panel openings 32 may be similarly configured and positioned in alignment with the topmost lower section panel openings 30.

The plurality of topmost upper section panel openings 34 are arranged to form zones of similarly configured openings defining an upper back portion 44, a lower back portion 46, and an upper section perimeter portion 48. The topmost upper section panel openings 34 forming the lower back portion 46 are smaller than the topmost upper section panel openings 34 forming the upper back portion 44 and the upper section perimeter portion 48. Thus, the lower back portion 46 is designed for providing enhanced comparative stiffness and support to a user's back when the user leans back against the upper section 16.

The topmost upper section panel openings 34 forming the upper back portion 44 are larger than the topmost upper section panel openings 34 forming the upper section perimeter portion 48 for facilitating airflow through the upper back portion 44. The difference in opening size also provides comparative stiffness and lateral support by the upper section perimeter portion 48.

The topmost lower section panel openings 30 forming the lower section medial portion 40 are larger than the topmost lower section panel openings 30 forming the lower section perimeter portion 42 for facilitating airflow through the lower section medial portion 40. The difference in opening size also provides comparative stiffness and lateral support by the lower section perimeter portion 42.

The lower section panels 20,22 are detachably coupled to each other by complimentary lower section snap portions 50 extending from the lower section panels 20,22. The lower section snap portions 50 are configured such that the lower section panels 20,22 are held in spaced relationship to each other by the snap portions 50 when the complimentary lower section snap portions 50 are joined together to couple the lower section panels 20,22 together.

The upper section panels 24,26 are detachably coupled to each other by complimentary upper section snap portions 52 extending from the upper section panels 24,26. The upper section snap portions 52 are configured such that the upper section panels 24,26 are held in spaced relationship to each other by the snap portions 52 when the complimentary upper section snap portions 52 are joined together to couple the upper section panels 24,26 together.

In use, the main member is positioned as described above to cover the base portion and back portion of a vehicle seat. The main member is then sat upon during use of the vehicle. The unit is easily folded and removed from a vehicle so that it may be used by drivers of mass transportation who may be subject to frequent use of a number of different vehicles. A storage bag may be provided to facilitate storage and transport of the folded main member.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle seat cushion assembly for use with a seat of a vehicle, the seat having a base portion and a back portion, the vehicle seat cushion assembly comprising:

a main member having upper and lower sections, said upper and lower sections being pivotable with respect to each other, said upper and lower sections being arranged such that said main member is adapted for positioning said lower section over the base portion of the vehicle seat and positioning said upper section adjacent to the back portion of the vehicle seat;

said lower section being formed by a pair of spaced lower section panels for permitting ventilation between said spaced lower section panels;

said upper section being formed by a pair of spaced upper section panels for permitting ventilation between said spaced upper section panels; and said pair of spaced lower section panels being detachably coupled together and said pair of spaced upper section panels being detachably coupled together such that said pair of spaced lower section panels are completely separable from each other and said pair of spaced upper section panels are completely separable from each other;

a topmost one of said pair of lower section panels having a plurality of topmost lower section panel openings for facilitating ventilation through topmost one of said pair of lower section panels;

a lowermost one of said pair of lower section panels having a plurality of lowermost lower section panel openings for facilitating ventilation through said lowermost one of said lower section panels;

a topmost one of said pair of upper section panels having a plurality of topmost upper section panel openings for facilitating ventilation through said topmost one of said pair of upper section panels;

a lowermost one of said pair of upper section panels having a plurality of lowermost upper section panel openings for facilitating ventilation through said lowermost one of said upper section panels;

wherein said plurality of topmost lower section panel openings are arranged to form zones of similarly configured openings defining a lower section medial portion and a lower section perimeter portion;

wherein said plurality of topmost upper section panel openings are arranged to form zones of similarly configured openings defining an upper back portion, a lower back portion, and an upper section perimeter portion;

wherein said topmost upper section panel openings forming said lower back portion are smaller than said topmost upper section panel openings forming said upper back portion and said upper section perimeter portion whereby said lower back portion is adapted for providing enhanced comparative stiffness and support to a user's back when a user leans back against said upper section;

wherein said topmost lower section panel openings forming said lower section medial portion are larger than said topmost lower section panel openings forming said lower section perimeter portion for facilitating airflow through said lower section medial portion;

wherein said topmost upper section panel openings forming said upper back portion are larger than said topmost upper section panel openings forming said upper section perimeter portion for facilitating airflow through said upper back portion;

said upper section panels being detachably coupled by complimentary upper section snap portions extending from said upper section panels, said upper section snap portions being configured to hold said upper section panels in spaced relationship to each other when said complimentary upper section snap portions are joined together to couple said upper section panels together;

said lower section panels being detachably coupled by complimentary lower section snap portions extending from said lower section panels, said lower section snap portions being configured to hold said lower section panels in spaced relationship to each other when said complimentary lower section snap portions are joined together to couple said lower section panels together; and wherein said spaced lower section panels are substantially coextensive with each other and said spaced upper section panels are substantially coextensive with each other;

wherein a first portion of said complimentary upper section snap portions on a first one of said upper section panels include a concave socket and a second portion of said complimentary upper section snap portions on a second one of said upper section panels include a protrusion that is complementary in shape to said concave socket;

wherein a first portion of said complimentary lower section snap portions on a first one of said lower section panels include a concave socket and a second portion of said complimentary lower section snap portions on a second one of said lower section panels include a protrusion that is complementary in shape to said concave socket; and wherein each of said snap portions of said upper section panels and said lower section panels has a substantially frustaconical exterior surface.

* * * * *